(12) United States Patent
Akasaka (10) Patent No.: US 12,170,434 B2
(45) Date of Patent: Dec. 17, 2024

(54) STIMULATED BRILLOUIN SCATTERING SUPPRESSED HIGHLY NON-LINEAR OPTICAL FIBER

(71) Applicant: FUJITSU LIMITED, Kawasaki (JP)

(72) Inventor: Youichi Akasaka, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 344 days.

(21) Appl. No.: 17/688,696

(22) Filed: Mar. 7, 2022

(65) Prior Publication Data

US 2023/0283039 A1    Sep. 7, 2023

(51) Int. Cl.
 H01S 3/30   (2006.01)
 H01S 3/067  (2006.01)
 H01S 3/10   (2006.01)

(52) U.S. Cl.
 CPC ......... *H01S 3/302* (2013.01); *H01S 3/06725* (2013.01); *H01S 3/10013* (2019.08)

(58) Field of Classification Search
 CPC ... H01S 3/302; H01S 3/10013; H01S 3/06725
 See application file for complete search history.

(56) References Cited

U.S. PATENT DOCUMENTS

| | | | | |
|---|---|---|---|---|
| 6,731,424 B1* | 5/2004 | Wu | ................... | H04B 10/2941 359/344 |
| 7,233,712 B2* | 6/2007 | Arellano | .............. | H04B 10/291 385/14 |
| 7,257,302 B2* | 8/2007 | Fermann | ............... | H01S 3/0057 385/127 |
| 7,518,788 B2* | 4/2009 | Fermann | ............... | H01S 3/0057 359/333 |
| 10,096,962 B2* | 10/2018 | Fermann | ............... | H01S 3/0078 |
| 10,763,635 B2* | 9/2020 | Goodno | ................ | H01S 3/1306 |
| 2004/0263950 A1* | 12/2004 | Fermann | ............. | H01S 3/06754 359/333 |

(Continued)

FOREIGN PATENT DOCUMENTS

WO    WO-2020160415 A1 *   8/2020   ........... H01L 21/324

OTHER PUBLICATIONS

Boggio et al., Experimental and numerical investigation of the SBS-threshold increase in an optical fiber by applying strain distributions, in Journal of Lightwave Technology, vol. 23, No. 11, pp. 3808-3814, Nov. 2005, doi: 10.1109/JLT.2005.856226 (Year: 2005).*

(Continued)

*Primary Examiner* — Peter Radkowski
(74) *Attorney, Agent, or Firm* — Maschoff Brennan (57) ABSTRACT

According to an aspect of an embodiment, operations may include obtaining a respective target temperature for each respective segment of multiple segments of a Highly Non-Linear optical Fiber (HNLF). Each respective target temperature may be based on a respective Zero-Dispersion Wavelength (ZDW) distribution of its corresponding segment and may be based on a target ZDW of the HNLF. The operations may also include adjusting a respective temperature of each respective segment that may be based on the respective target temperature of each respective segment such that each respective segment has a respective ZDW that is within a threshold of the target ZDW.

6 Claims, 4 Drawing Sheets

(56) References Cited

U.S. PATENT DOCUMENTS

| | | | | |
|---|---|---|---|---|
| 2005/0018950 A1* | 1/2005 | Arellano | ............ | H01S 3/06754 385/14 |
| 2007/0273960 A1* | 11/2007 | Fermann | ............ | H01S 3/06754 359/333 |
| 2015/0255942 A1* | 9/2015 | Fermann | ............ | H01S 3/0057 359/337 |
| 2019/0305504 A1* | 10/2019 | Goodno | ............ | H01S 3/2391 |
| 2022/0149579 A1* | 5/2022 | Yusim | ............ | H01L 21/324 |

OTHER PUBLICATIONS

Hansryd et al., Increase of the SBS threshold in a short highly nonlinear fiber by applying a temperature distribution, in Journal of Lightwave Technology, vol. 19, No. 11, pp. 1691-1697, Nov. 2001, doi: 10.1109/50.964069 (Year: 2001).*

Lillieholm et al., Optimization and characterization of highly nonlinear fiber for broadband optical time lens applications, Opt. Express 25, 12566-12580 (2017) (Year: 2017).*

Lorenzen et al., Brillouin suppression in a fiber optical parametric amplifier by combining temperature distribution and phase modulation, in Optical Fiber Communication Conference/National Fiber Optic Engineers Conference, OSA Technical Digest (CD) (Optica Publishing Group, 2008), paper OML1 (Year: 2008).*

Lou et al., Increasing the SBS threshold by applying a flexible temperature modulation technique with temperature measurement of the fiber core, Opt. Express 28, 13323-13335 (2020) (Year: 2020).*

Shamsshooli et al., Noise figure of a 3-stage hybrid amplifier using parametric wavelength converters and EDFA, 2020 IEEE Photonics Conference (IPC), Vancouver, BC, Canada, 2020, pp. 1-2, doi: 10.1109/IPC47351.2020.9252276 (Year: 2020).*

Zia et al., Supercontinuum Generation in Media with Sign-Alternated Dispersion. Laser & Photonics Reviews 2020, 14, 2000031. https://doi.org/10.1002/lpor.202000031 (Year: 2020).*

* cited by examiner

STIMULATED BRILLOUIN SCATTERING SUPPRESSED HIGHLY NON-LINEAR OPTICAL FIBER

FIELD

The embodiments discussed in the present disclosure are related to stimulated Brillouin scattering (SBS) suppressed Highly Non-Linear optical Fiber (HNLF).

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. Further, optical pumping may be used to amplify optical signals that propagate through optical networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include obtaining a respective target temperature for each respective segment of multiple segments of a Highly Non-Linear optical Fiber (HNLF). Each respective target temperature may be based on a respective Zero-Dispersion Wavelength (ZDW) distribution of its corresponding segment and may be based on a target ZDW of the HNLF. The operations may also include adjusting a respective temperature of each respective segment that may be based on the respective target temperature of each respective segment such that each respective segment has a respective ZDW that is within a threshold of the target ZDW.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks may include nodes that may be configured to communicate information to each other via optical signals carried by optical fibers. In some circumstances, optical networks may employ Highly Non-Linear optical Fiber (HNLF) to carry the optical signal because the non-linearities in the HNLF allow for increased data rate transparency for high-speed communications. Optical networks employing HNLF may use a continuous wave light source such as a laser to project the information from the source through the network. In some circumstances, optical pumping may be used to amplify optical signals that propagate within an optical network. Amplification of the optical signals within the optical fibers may enable the optical signals to travel a greater distance by compensating for losses that may affect the optical signal, such as degradations of the optical signal due to a noisy channel within the optical networks.

However due to the nature of the non-linearities in the HNLF, in some circumstances, a strong optical pump power may be detrimental to the optical signal. For example, too much strength of the amplified optical signal in an HNLF may lead to non-linear backscattering specifically, stimulated Brillouin scattering (SBS). SBS may adversely impact, distort, and degrade the optical signal which may lead to suboptimal performance of the optical network. The maximum amplification, therefore, of optical signals through an HNLF may be governed by an HNLF's SBS threshold. In the present disclosure, reference to the term "SBS threshold" of an optical fiber (e.g., HNLF) may include an amount of signal power of signals that may propagate through the optical fiber while keeping signal degradation that may be caused by SBS below a particular amount.

According to one or more embodiments of the present disclosure, segments of HNLF may be spliced together to form an overall segmented HNLF. The splicing of the segments may interrupt the backscattering process and accordingly increase the SBS threshold of the segmented HNLF as compared to a uniform, continuous HNLF and thereby may reduce the effects of SBS and may also accordingly increase the allowable pump power for the optical signal.

Other aspects of the HNLF may additionally affect the SBS threshold. For example, zero dispersion wavelength (ZDW) variance along an HNLF may nonuniformly affect the pumped optical signal which, in turn, may reduce an amount in the increase in SBS threshold.

Accordingly, one or more embodiments of the present disclosure may include operations and/or elements to help reduce a longitudinal ZDW variance of the HNLF. For example, respective ZDW distributions of the respective segments may be affected by the respective temperatures of the respective segments. In some embodiments and as discussed in detail below, the temperatures of the different HNLF segments may therefore be adjusted (e.g., via one or more temperature controllers) to help reduce longitudinal ZDW variance across the HNLF.

Embodiments of the present disclosure will be explained with reference to the accompanying drawings.

Figure 1A:
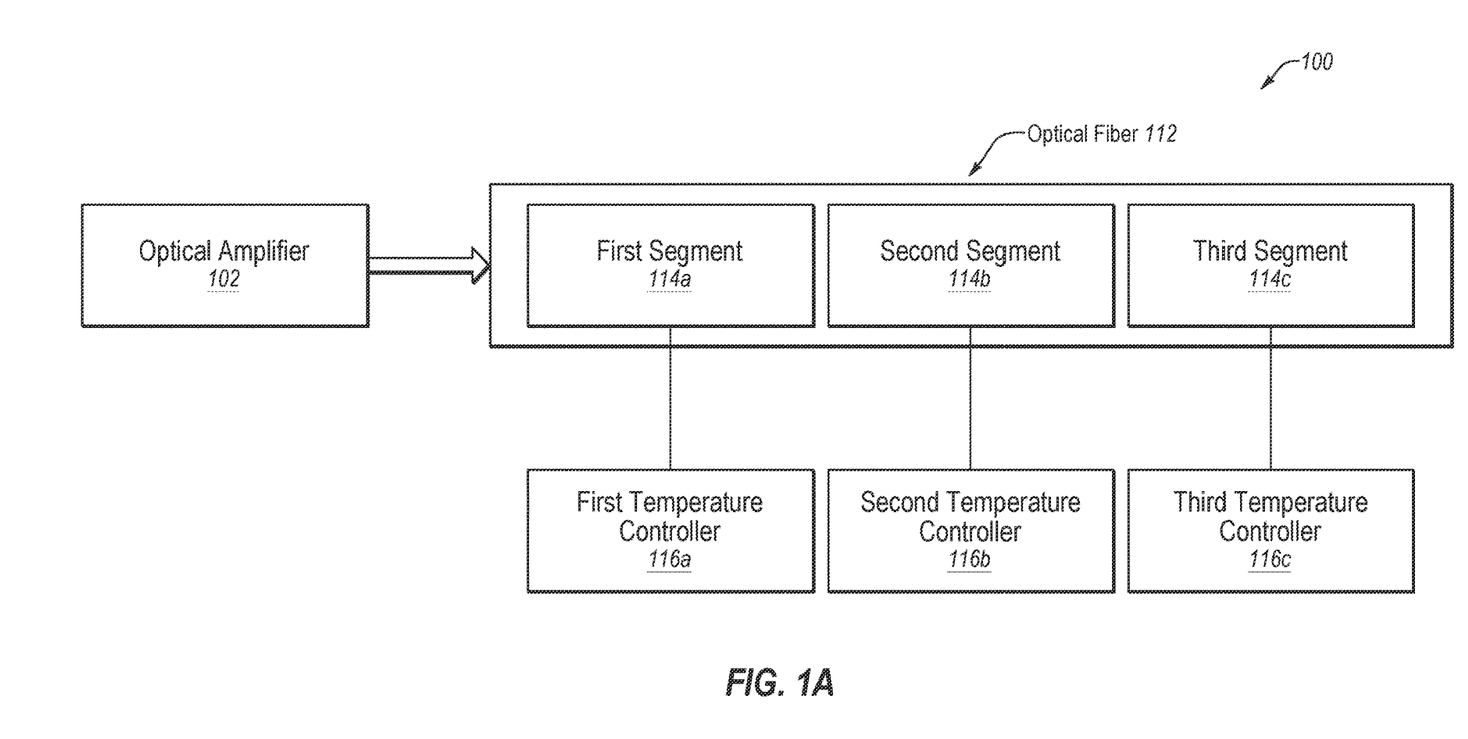
FIG. 1A illustrates an example embodiment of an optical system configured to increase an SBS threshold in a Highly Non-Linear optical Fiber (HNLF).

FIG. 1A illustrates an example embodiment of an optical system 100 configured to increase an SBS threshold of an optical fiber 112, in accordance with at least one embodiment of the present disclosure. The optical system 100 may include an optical amplifier 102, an optical fiber 112, and one or more temperature controllers 114.

The optical signals may include any optical signal configured to carry data. For example, the optical signals may include an optical signal generated by a light emitting diode (LED), a laser such as a laser diode, having data modulated thereon, and/or other similar optical signals. In some embodiments, the optical signals may be generated by one or more transmitting sources, such as an optical transmitter or tunable laser source, configured to convey data and/or information over an optical network.

The optical amplifier 102 may include any suitable system, apparatus, or device configured to amplify optical signals that may propagate through the optical system 100. For example, in some embodiments, the optical amplifier 102 may include a pump source configured to generate a pumping beam. For example, the pump source may include a light source generator that may be configured to produce the pumping beam. For instance, the pump source may include a laser device that may be configured to produce and/or output the pumping beam. The optical amplifier 102 may be configured to combine the pumping beam with the optical signals such that the pumping beam may amplify the optical signals.

In these or other embodiments, the optical amplifier 102 may include one or more other elements that may amplify the pumping beam and/or the optical signals. For example, in some embodiments, the optical amplifier 102 may include any suitable amplification element, such as a doped fiber, that may amplify the pumping beam prior to the pumping beam being combined with the optical signals. Additionally or alternatively, the optical amplifier 102 may include one or more amplification elements that may amplify the optical signals after the optical signals have been combined with the pumping beam.

In some embodiments, the optical fiber 112 may be configured to carry optical signals that have been amplified by the optical amplifier 102. Additionally or alternatively, the system 100 may not include the optical amplifier 102 and the optical fiber 112 may be configured to carry optical signals that have not yet undergone any additional amplification after transmission.

In some embodiments, the optical fiber 112 may include an HNLF. Additionally, the optical fiber 112 may include multiple segments. For example, in the illustrated embodiment, the optical fiber 112 may include a first segment 114a, a second segment 114b, and a third segment 114c. As indicated above and described in further detail below, the configuration of the optical fiber 112 having multiple segments may help increase the SBS threshold of the optical fiber 112 as illustrated, for example, in FIG. 1B.

In some embodiments, the optical fiber 112 may include any medium suitable for optical transmission. For example, the optical fiber 112 may include fluorozirconate glass, fluoroaluminate glass, chalcogenide glass, crystalline materials, and/or other mediums that may be suitable for optical transmissions. Additionally or alternatively, the optical fiber 112 may include one or more materials. For example, the first segment 114a may be made from a first material, the second segment 114b may be made from a second material, and the third segment 114c may be made from a third material. In these and other embodiments, the first material, the second material, and the third material may be compatible such that, when spliced together, the optical fiber 112 may carry optical signals.

Figure 1B:
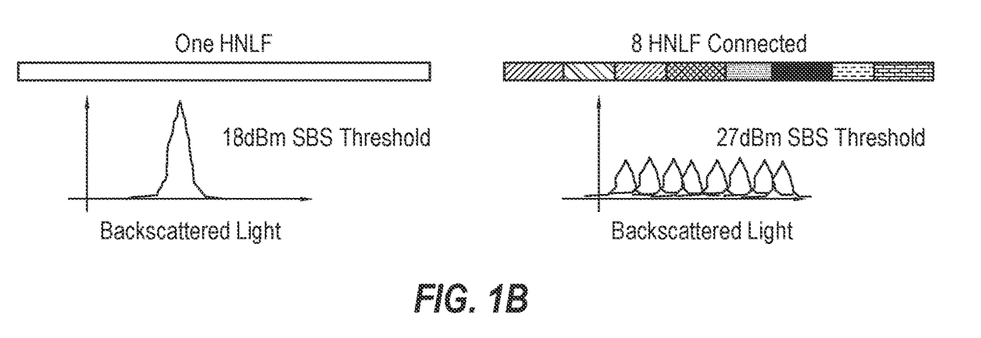
FIG. 1B illustrates two example graphs comparing an SBS threshold in one continuous HNLF (left) and an SBS threshold in an HNLF comprising various segments spliced together (right)

As indicated above, the segments 114 spliced together to form the HNLF may increase the SBS threshold of the optical fiber 112. For example, as illustrated in FIG. 1B, one continuous, 200-meter optical fiber may have an SBS threshold reaching 18 dBm. By contrast, a version of the optical fiber 112 that includes eight, 25-meter segments spliced together may have an SBS threshold reaching 27 dBm.

In these and other embodiments, the segments 114 may be selected based on a target SBS threshold of the optical fiber 112. As described in the above example in FIG. 1B, in some instances, the number of the segments 114 may increase as the SBS threshold increases. As such, in some embodiments, the number of segments 114 may be based on the target SBS threshold in the optical fiber 112. For example, a larger number of segments 114 may be used to satisfy a first target SBS threshold than that which may be used to satisfy a second target SBS threshold that is lower than the first target SBS threshold.

In some embodiments, a length of the segments 114 may be selected based on the target SBS threshold of the optical fiber 112. As shown in FIG. 1B, as the length of each of the segments 114 increases, the SBS threshold may decrease. That is, as the length of each of the segments increases, the effects of SBS may correspondingly increase and may thereby degrade an optical signal propagating through the optical system 100. It may therefore follow that, as the target SBS threshold increases, the length of each of the segments 114 may decrease. For example, shorter segments 114 may be used to satisfy the first target SBS threshold whereas longer segments 114 may be used to satisfy the second target SBS threshold that is lower than the first target SBS threshold.

In some embodiments, the target SBS threshold of the optical fiber 112 may be based on a target power level of the optical signal that may propagate through the optical system 100. For example, the optical signal propagating through the optical system 100 may have a particular target power level, which may cause a particular amount of SBS. As such, the target SBS threshold of the optical fiber 112 may be at least as high as the particular target power level. Additionally or alternatively, the target SBS threshold of the optical fiber 112 may be based on an amount of amplification that may be caused by the optical amplifier 102. For example, the amplification caused by the optical amplifier 102 may increase the signal power of the optical signal and accordingly may increase the SBS associated with the optical signal. As such, the target SBS threshold of the optical fiber 112 may be determined by taking the amount of amplification into consideration.

In these and other embodiments, an increase in a number of the segments 114 may lead to an increase in the SBS threshold (as discussed above and illustrated in FIG. 1B), but however may also lead to an increase in a variance in the ZDW distribution of the optical fiber 112. The variance in the ZDW distribution of the optical fiber 112 may nonuniformly affect the optical signal which, in turn, may reduce an amount of the increase in the SBS threshold. As such, in some instances, the respective ZDW distribution of one or more of the segments 114 may be adjusted. For example, increasing the temperature of the segments 114 may increase the ZDW of the segments 114 and, conversely, decreasing the temperature of the segments 114 may decrease the ZDW of the segments 114.

In some embodiments, adjusting the temperature of the segments 114 may be accomplished by using a number of temperature controllers 116 that may be configured to control the temperature of the segments 114. For example, in some embodiments, the optical system 100 may include a first temperature controller 116a that may be configured to control the temperature of the first segment 114a, a second temperature controller 116b that may be configured to control the temperature of the second segment 114b, and a third temperature controller 116c that may be configured to control the temperature of the third segment 114c.

In some embodiments, the first temperature controller 116a, the second temperature controller 116b, and the third temperature controller 116c may be a Peltier device, Peltier heat pump, solid state refrigerator, thermoelectric cooler, or other thermoelectric device designed to heat or cool the optical fiber 112.

The number of temperature controllers 116 is merely illustrative and is not limiting. For example, in some embodiments, the optical system 100 may include fewer or more than three temperature controllers configured to control the temperature of various segments of the optical fiber 112. In some embodiments, multiple temperature controllers may be configured to control the temperature of the first segment 114a and/or the second segment 114b and/or the third segment 114c. For example, the first temperature controller 116a, the second temperature controller 116b, and the third temperature controller 116c may each be configured to control the temperature of different portions of the first segment 114a that thereby they may adjust different temperatures along the first segment 114a.

In these and other embodiments, tuning the temperature of the first segment 114a, the second segment 114b, and the third segment 114c may change their respective ZDWs which may change the ZDW distribution of the optical fiber 112. For example, increasing the temperature of the first segment 114a may increase its ZDW from 1540 nm. to 1550 nm. Conversely, for example, cooling the first segment 114a may decrease its ZDW from 1540 nm. to 1530 nm.

In some embodiments, a control system may be configured to tune a respective temperature of each of the temperature controllers 116 based on a target temperature. In some embodiments, the target temperature for each of the temperature controllers 116 may be based on a target ZDW of the optical fiber 112.

In some embodiments, the target ZDW may be based on a wavelength of the laser pump of the optical amplifier 102. In an example embodiment of optical system 100, the laser pump may be configured to amplify the optical signal at a wavelength of 1550 nm. The target ZDW of the optical fiber 112 may accordingly be 1550 nm. In these and other embodiments, the target ZDW is not limited to a single wavelength and can be representative of a range of wavelengths. For example, the target ZDW may be a single wavelength (e.g., 1550 nm.). Additionally or alternatively, the target ZDW may be a range of wavelengths (e.g., 1550±5 nm.).

In these and other embodiments, the target ZDW may be based on a target carrier frequency of an optical signal that may propagate in the optical system 100. For example, in some embodiments, the target ZDW may be set as the wavelength of the target carrier frequency.

In some embodiments, a material of the optical fiber 112 may be selected based on the target ZDW. For example, the target ZDW may be set at 1550 nm. Accordingly, the optical fiber 112 may be selected based on a material that may allow the optical fiber 112 to have a ZDW 1550 nm. Because silica-based glasses may have a ZDW of 1550 nm., the optical fiber 112 may include silica-based glasses.

Figure 1C:
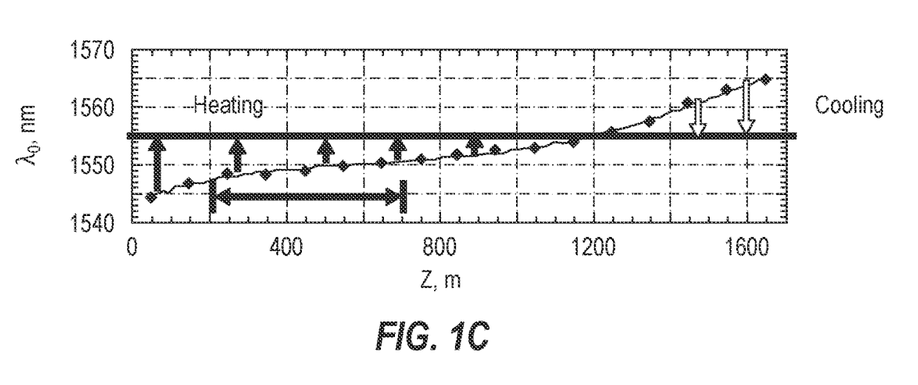
FIG. 1C illustrates an example graph of adjusting a ZDW distribution along the length of a HNLF through targeted temperature changes.

In some embodiments, the temperature of the segments 114 in the optical fiber 112 may be adjusted to align their respective ZDW distributions within a target amount of the target ZDW. For example, the target ZDW may be set at 1550 nm. and the optical fiber 112 may include the first segment 114a, the second segment 114b, and the third segment 114c. In the example embodiment, the optical fiber 112 may have a linearly decreasing ZDW distribution along its length such that the first segment 114a has a ZDW of 1550 nm., the second segment 114b has a ZDW of 1540 nm., and the third segment 114c has a ZDW of 1530 nm. As a result, the temperature controllers 116 may be configured to progressively increase the temperature along the length of the optical fiber 112 in order to increase the ZDWs along the length of the optical fiber 112 to 1550 nm., the target ZDW. FIG. 1C illustrates an example embodiment of adjusting the temperatures of the segments 114 in the optical fiber 112 to align within a target amount of the target ZDW.

In some embodiments, the segments 114 may be selected based on their respective ZDW distributions being able to align within a target amount of each other. For example, the first segment may be selected because its ZDW may be within 5 nm. of the second segment 114b which may be within 5 nm. of the third segment 114c. Additionally or alternatively, the first segment 114a, the second segment 114b, and the third segment 114c may be selected because they may have ZDWs within the target amount of each other which may be 10 nm., above or below, the target ZDW as illustrated, for example, in FIG. 1C.

In some embodiments, the segments 114 may be selected based on their respective ZDW distributions being able to align within a target amount of the target ZDW threshold within a target thermal tuning range. In some embodiments, the target thermal tuning range may be selected based on limitations associated with the temperature controllers 116. For example, the temperature controllers 116 may be limited in their heating and cooling capacities to temperatures within a range (e.g., 25° C.-150° C.). Additionally or alternatively, the target thermal tuning range may be selected based on external factors associated with the optical system 100 (e.g., environment, components, materials etc.) Because the temperature tuning may be limited to temperatures that fall within the target thermal tuning range, the segments 114 may be selected based on each having a ZDW distribution that may be tuned to be within the threshold of the target ZDW using a temperature that falls within the target thermal tuning range.

Modifications, additions, or omissions may be made to the optical system 100 without departing from the scope of the present disclosure. For example, in some embodiments, the optical system 100 may include any number of other components that may not be explicitly illustrated or described.

Figure 2:
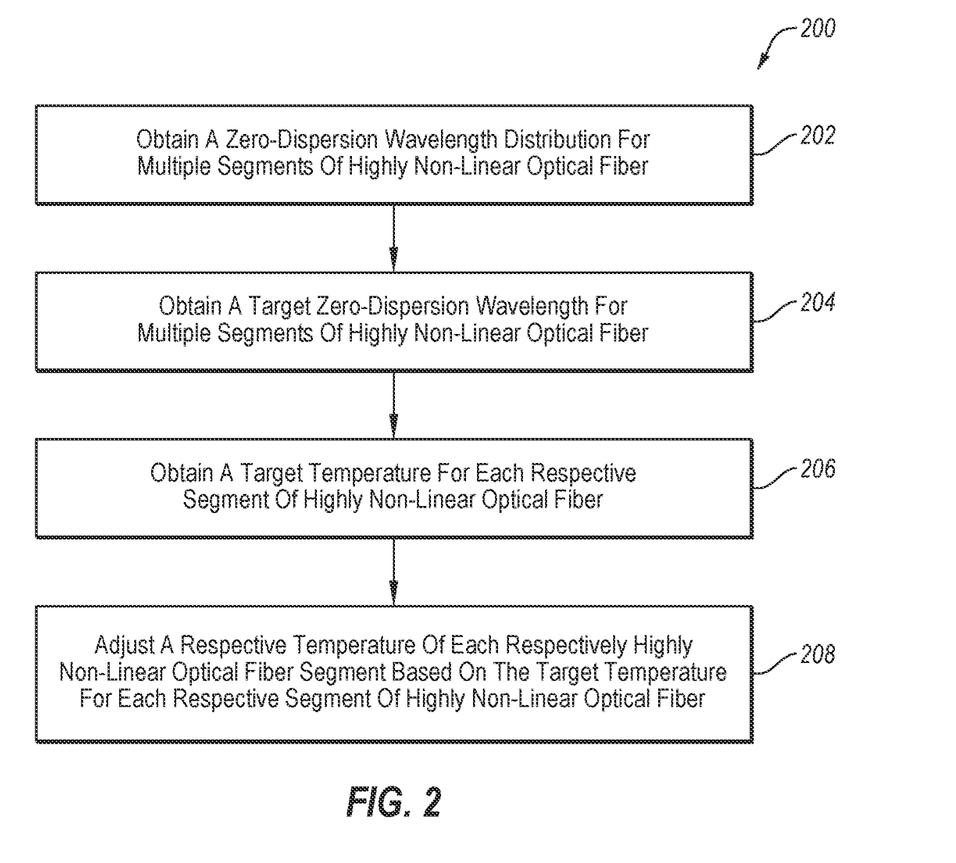
FIG. 2 is a flow chart of an example method of increasing the SBS threshold in an HNLF, all arranged in accordance with some embodiments of the present disclosure.

FIG. 2 is a flow chart of an example method 200 of increasing the SBS threshold in an HNLF, arranged in accordance with some embodiments of the present disclosure. The method 200 may be implemented by any suitable element of an optical system such as the optical system 100 of FIG. 1A as described above. Although illustrated as discrete steps, various steps of the method 200 may be divided into additional steps, combined into fewer steps, or eliminated, depending on the desired implementation. Additionally, the order of performance of the different steps may vary depending on the desired implementation.

In some embodiments, the method 200 may begin at block 202. At block 202, a ZDW distribution may be obtained for multiple segments of an HNLF. For example, the ZDW distribution in any of the segments of HNLF may be the same or similar as the ZDW distributions described above with respect to FIGS. 1A and 1C. Additionally or alternatively, the ZDW distributions may be obtained for each of the segments of HNLF individually as also described above.

At block 204, a target ZDW may be obtained for the segments of HNLF. For example, the target ZDW may be provided as an input parameter and may be based on any number of factors such as described above with respect to FIG. 1A. Additionally or alternatively, the target ZDW may be determined based on a target signal frequency such as described above.

At block 206, a target temperature for each respective segment of HNLF may be obtained. In some embodiments, the target temperature may be based on a difference between the ZDW of each respective segment of HNLF that may be obtained at block 202 and the target ZDW that may be obtained at block 204. For example, the ZDW distribution of the segments of HNLF described in block 202 may be lower than the target ZDW described in block 204 which may result in an increase in the target temperature as described above with respect to FIG. 1A and as illustrated in FIG. 1C. Additionally or alternatively, the ZDW distribution of the segments of HNLF that may be obtained in block 202 may be higher than the target ZDW that may be obtained in block 204 which may result in a decrease in the target temperature as described above with respect to FIG. 1A and as illustrated in FIG. 1C. In some embodiments, each segment of HNLF may obtain multiple target temperatures as illustrated in FIG. 1C. In some embodiments, a segment of HNLF may have a progressively increasing ZDW distribution and therefore may have several temperature controllers that may be configured to control temperatures of several portions of the segment of HNLF which may result in progressively changing target temperatures along the length of the segment of HNLF as described above with respect to FIG. 1A.

At block 208, a respective temperature of each HNLF segment may be adjusted based on the target temperature obtained for each of the segments of HNLF. In some embodiments, the temperature controllers, as described in further detail above in FIG. 1A, may be configured to adjust the respective temperature of each HNLF segment based on the target temperature or the target temperatures. In some embodiments, each HNLF segment may have one temperature controller that may be configured to distribute a temperature uniformly along each HNLF segment. Additionally or alternatively, each HNLF segment may have multiple temperature controllers that may be configured to adjust the temperature of each HNLF segment based on the target temperature or the target temperatures of each HNLF segment as described in related embodiments in FIGS. 1A and 1C above.

Modifications, additions, or omissions may be made to the method 200 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

Figure 3:
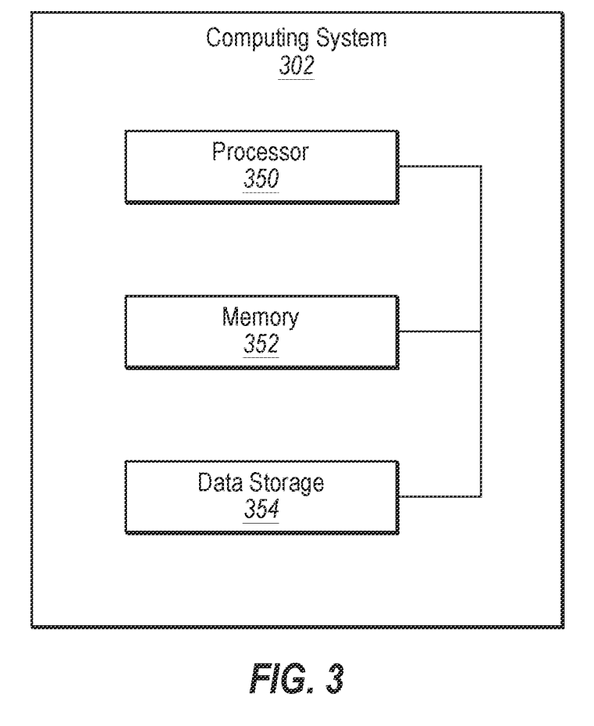
FIG. 3 illustrates a block diagram of an example computing system, all arranged in accordance with some embodiments of the present disclosure.

FIG. 3 illustrates a block diagram of an example computing system 302, according to at least one embodiment of the present disclosure. The computing system 302 may be configured to implement or direct one or more suitable operations described in the present disclosure. For example, the computing system 302 may be configured to direct each of the temperature controllers 116 to adjust the temperature of each of the segments 114 as described and illustrated in FIGS. 1A, 1C, and 2 above. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

The memory 352 and the data storage 354 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a target Zero-Dispersion Wavelength (ZDW) distribution for a Highly Non-Linear optical Fiber (HNLF) having a plurality of segments spliced together to form the HNLF, two or more segments of the plurality of segments being made of different materials and having different ZDW properties with respect to each other;
   determining a difference between the target ZDW distribution and individual ZDW distributions of a plurality of ZDW distributions respectively corresponding to each segment of the plurality of segments;
   determining a respective target temperature for each respective segment based on the determined differences between the target ZDW distribution and the ZDW distribution corresponding to each respective segment; and
   adjusting a respective temperature of each respective segment based on the respective target temperature of each respective segment such that each respective segment has a respective ZDW that is within a threshold of the target ZDW.

2. The method of claim 1, wherein the segments of the plurality of segments are selected based on their respective ZDW distributions being able to align within a target amount of each other within a target thermal tuning range.

3. The method of claim 1, wherein adjusting the respective temperature of each respective segment includes controlling a respective temperature controller attached to a corresponding respective segment.

4. The method of claim 1, wherein a number of segments included in the plurality of segments is based on a target Stimulated Brillouin Scattering (SBS) threshold of the HNLF.

5. The method of claim 4, wherein the target SBS threshold is based on a target power level of an optical signal.

6. The method of claim 1, wherein the target ZDW is based on a wavelength of a laser pump of an optical amplifier.

* * * * *